(12) United States Patent
Ikegami et al.

(10) Patent No.: US 10,514,878 B2
(45) Date of Patent: Dec. 24, 2019

(54) DISPLAY CONTROLLER, DISPLAY SYSTEM, AND DISPLAY CONTROL METHOD

(71) Applicant: MITSUBISHI ELECTRIC CORPORATION, Tokyo (JP)

(72) Inventors: Kimika Ikegami, Tokyo (JP); Masanobu Osawa, Tokyo (JP); Takuji Morimoto, Tokyo (JP); Shogo Okamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 15/757,714

(22) PCT Filed: Oct. 30, 2015

(86) PCT No.: PCT/JP2015/080753
§ 371 (c)(1),
(2) Date: Mar. 6, 2018

(87) PCT Pub. No.: WO2017/072957
PCT Pub. Date: May 4, 2017

(65) Prior Publication Data
US 2019/0042176 A1    Feb. 7, 2019

(51) Int. Cl.
*G06F 3/14* (2006.01)
*B60Q 9/00* (2006.01)
(Continued)

(52) U.S. Cl.
CPC ............. *G06F 3/1423* (2013.01); *B60Q 9/00* (2013.01); *G01C 21/3626* (2013.01);
(Continued)

(58) Field of Classification Search
CPC .. B60Q 9/00; G01C 21/3626; G01C 21/3658; G06F 3/1423; G09G 5/003; G09G 5/12; B60K 37/06; B60K 2370/166
See application file for complete search history.

(56) References Cited

U.S. PATENT DOCUMENTS 9,552,088 B2   1/2017 Tuzar
2007/0126698 A1   6/2007 Iwamoto et al.
(Continued)

FOREIGN PATENT DOCUMENTS

DE   102006035171 A1   1/2008
DE   102006060520 A1   6/2008
(Continued)

OTHER PUBLICATIONS

Office Action dated May 29, 2018 in Japanese Application No. 2017-547319 with a Machine Translation.
(Continued)

*Primary Examiner* — Shaheda A Abdin
(74) *Attorney, Agent, or Firm* — Birch, Stewart, Kolasch & Birch, LLP

(57) ABSTRACT

Disclosed is a display controller including: a main display control unit for controlling a display performed by a main display unit on the basis of main operation information from a main operation unit; and a sub display control unit for controlling a display performed by a sub display unit on the basis of sub operation information from a sub operation unit. When the main operation unit is receiving an operation on the basis of the main operation information, the sub display control unit performs a control operation of not displaying, among the items which the sub display control unit causes the sub display unit to currently display, both the item related to an item to which an operation is being received by the main operation unit, and the item to which a function needing a change in display performed by the main display unit is assigned.

9 Claims, 12 Drawing Sheets

(51) Int. Cl.
*G01C 21/36* (2006.01)
*G09G 5/00* (2006.01)
*G09G 5/12* (2006.01)

(52) U.S. Cl.
CPC ......... *G01C 21/3658* (2013.01); *G09G 5/003* (2013.01); *G09G 5/12* (2013.01); *G09G 2380/10* (2013.01)

(56) References Cited

U.S. PATENT DOCUMENTS

| | | |
|---|---|---|
| 2013/0194228 A1 | 8/2013 | Tuzar |
| 2014/0015737 A1 | 1/2014 | Inoue |
| 2016/0004755 A1 | 1/2016 | Sempuku |
| 2016/0212253 A1* | 7/2016 | Akama .............. G01C 21/3664 |

FOREIGN PATENT DOCUMENTS

| | | |
|---|---|---|
| DE | 102010042376 A1 | 12/2011 |
| DE | 102013020795 A1 | 6/2015 |
| JP | 8-293098 A | 11/1996 |
| JP | 2003-259467 A | 9/2003 |
| JP | 2007-45169 A | 2/2007 |
| JP | 2007-161064 A | 6/2007 |
| JP | 2009-12651 A | 1/2009 |
| JP | 2012-217129 A | 11/2012 |
| JP | 5582125 B2 | 9/2014 |
| WO | WO 2014/203395 A1 | 12/2014 |

OTHER PUBLICATIONS

German Office Action, dated Apr. 12, 2019, for German Application No. 112015007064.8, with an English translation.

* cited by examiner

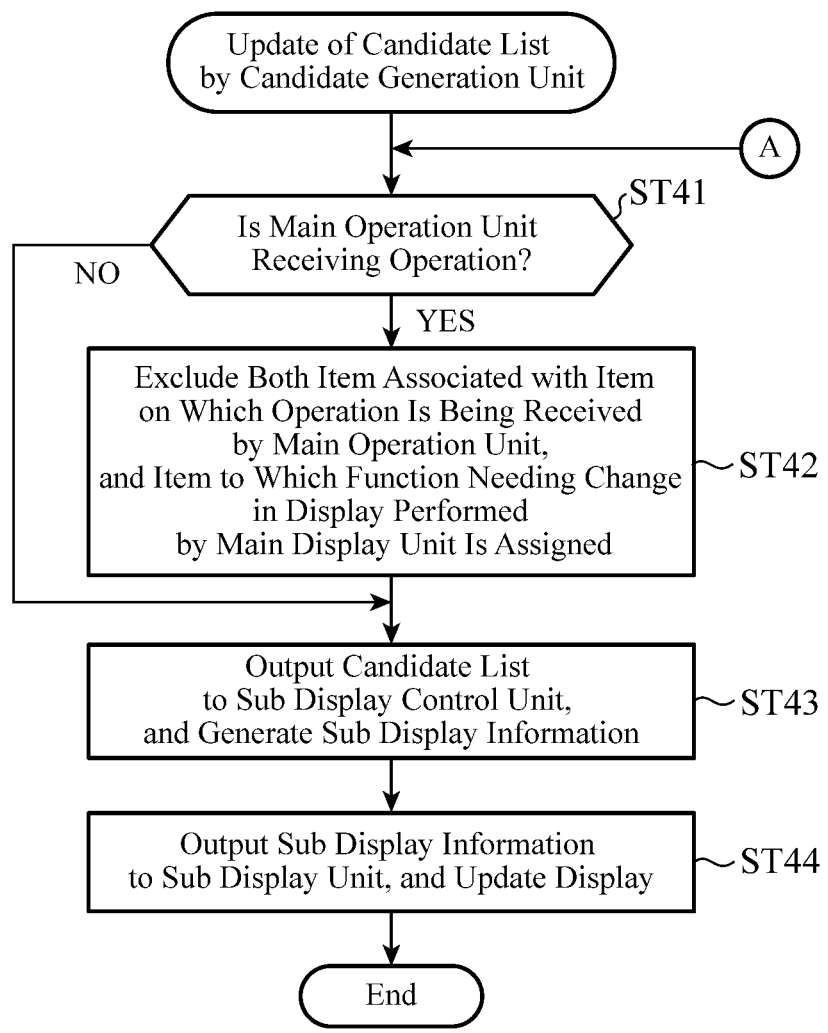

DISPLAY CONTROLLER, DISPLAY SYSTEM, AND DISPLAY CONTROL METHOD

TECHNICAL FIELD

The present disclosure relates to a display controller for controlling display performed by vehicle-mounted equipment or the like mounted in a vehicle, a display system provided with vehicle-mounted equipment or the like and the display controller, and a display control method for vehicle-mounted equipment or the like.

BACKGROUND ART

An information display system described in Patent Literature 1 connects an apparatus for vehicle and a mobile terminal, and causes the apparatus for vehicle to display a screen of the mobile terminal. In this information display system, when the apparatus for vehicle and the mobile terminal are connected to each other via communications, only one of the apparatus for vehicle and the mobile terminal on which an input operation has been previously performed is enabled to be operated while the one on which an input operation has been previously performed is operated. Therefore, also when the mobile terminal and the apparatus for vehicle are operated by two persons during the same time period, only one of them which has been previously operated is enabled to be operated and a malfunction can be prevented from being caused due to simultaneous operations on them by two persons.

CITATION LIST

Patent Literature

Patent Literature 1: Japanese Unexamined Patent Application Publication No. 2012-217129

SUMMARY OF INVENTION

Technical Problem

Although the information display system described in above-mentioned Patent Literature 1 enables only one of the apparatus for vehicle and the mobile terminal which has been previously operated to be operated, thereby making it possible to prevent a malfunction from being caused due to simultaneous operations on them by two persons, there is a case in which convenience is improved by making it possible for two persons to simultaneously operate the two apparatuses. For example, in vehicle-mounted equipment having a navigation function of guiding a vehicle, and an AV (Audio Visual) function of playing back a piece of music, and having plural operation means, even though an AV function such as a function of changing the piece of music currently being played back is operated by using an operation means while a navigation function such as a function of searching for a destination is operated by using another operation means, no malfunction occurs because there is no interference between the two functions. In addition, convenience is improved because the two functions can be operated simultaneously. However, in the technique disclosed in above-mentioned Patent Literature 1, the fact that there is a case in which convenience is improved by making it possible for plural functions to be operated simultaneously is not taken into consideration.

An aspect of embodiments of the present disclosure is made in order to solve the above-mentioned problem, and it is therefore an object of embodiments to provide a technique for making it possible for functions to work in cooperation with each other while preventing interference between the functions, thereby improving convenience as a result of making it possible for the functions to be operated simultaneously.

Solution to Problem

According to an aspect of embodiments of the present disclosure, there is provided a display controller including: a main display control unit for performing display control of a main display unit on a basis of main operation information from a main operation unit that receives an operation on an item to which a function is assigned and outputs the operation as the main operation information; and a sub display control unit for performing display control of a sub display unit on a basis of sub operation information from a sub operation unit that receives an operation on an item to which a function is assigned and outputs the operation as the sub operation information, wherein the sub display control unit is configured to perform display control on a basis of the main operation information when the main operation unit is receiving an operation so as to display, among items currently displayed on the sub display unit, neither an item related to an item to which an operation is being received by the main operation unit nor an item to which a function needing a change in display performed by the main display unit is assigned.

Advantageous Effects of Invention

According to an aspect of embodiments of the present disclosure, because the display controller is configured so as not to, when the main operation unit is receiving an operation, display, among the items which the sub display unit is caused to currently display, either the item related to an item to which an operation is being received by the main operation unit, or the item to which a function needing a change in display performed by the main display unit is assigned, cooperation can be established between the main operation unit and the main display unit, and the sub operation unit and the sub display unit while interference between the main operation unit and the main display unit, and the sub operation unit and the sub display unit is prevented. As a result, an operation on the main operation unit and an operation on the sub operation unit can be simultaneously performed, and the convenience can be improved.

BRIEF DESCRIPTION OF DRAWINGS

FIG. 9 is a flowchart showing operations when a candidate generation unit updates a candidate list, in a display controller according to Embodiment 2;

DESCRIPTION OF EMBODIMENTS

Hereafter, in order to explain this disclosure in greater detail, embodiments according to this disclosure will be described with reference to the accompanying drawings.

Embodiment 1

Figure 1:
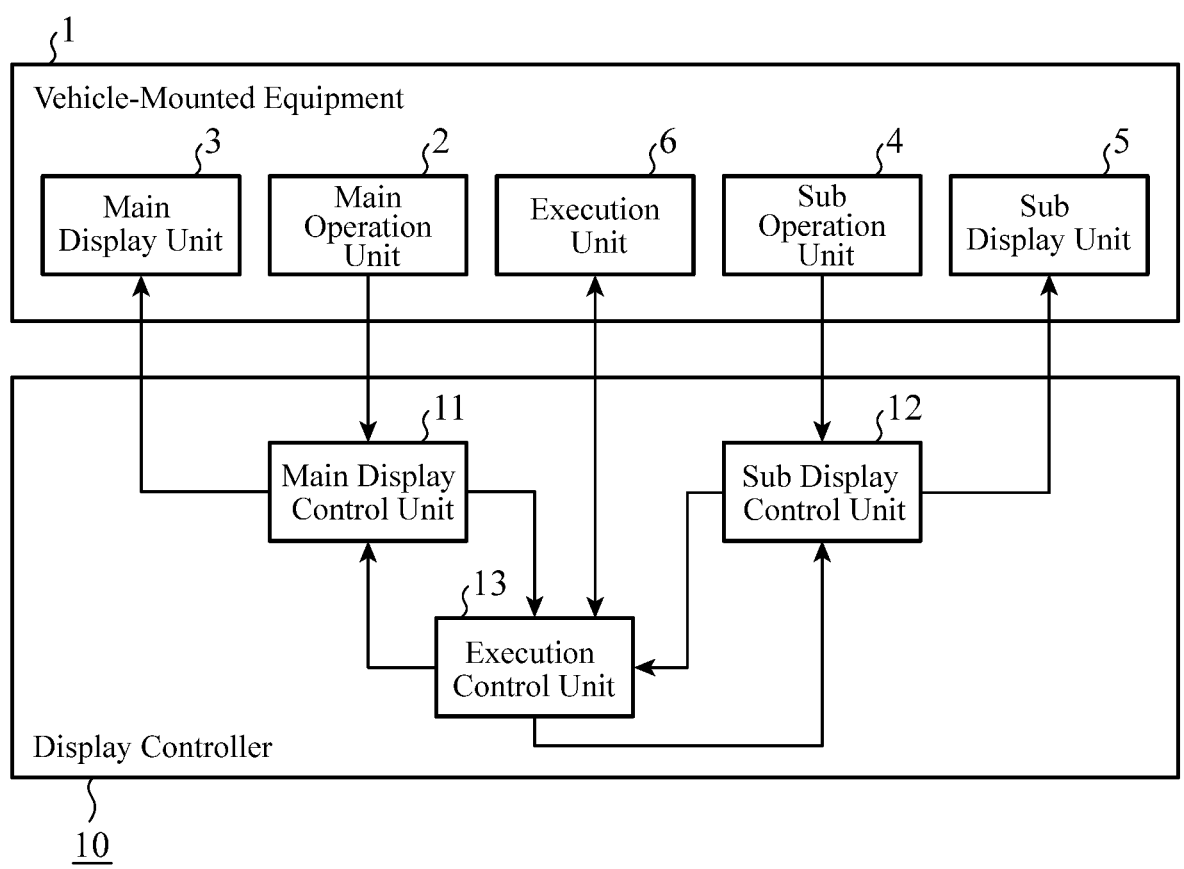
FIG. 1 is a block diagram showing an exemplary configuration of a display system according to Embodiment 1 of the present disclosure.

FIG. 1 is a block diagram showing an exemplary configuration of a display system according to Embodiment 1 of the present disclosure. As shown in FIG. 1, the display system according to Embodiment 1 includes vehicle-mounted equipment 1 and a display controller 10. The vehicle-mounted equipment 1 is mounted in a vehicle such as a car, and includes an operation unit for receiving operations, and a display unit for performing display. The display controller 10 is mounted in the vehicle such as a car, and receives information about an operation which is performed on the operation unit of the vehicle-mounted equipment 1, and causes the vehicle-mounted equipment 1 to execute a function corresponding to the operation. The display controller 10 also controls display performed by the display unit of the vehicle-mounted equipment 1.

The vehicle-mounted equipment 1 includes two sets of an operation unit for receiving operations, and a display unit for performing display. In the example shown in FIG. 1, the vehicle-mounted equipment 1 includes one set of a main operation unit 2 and a main display unit 3, and another set of a sub operation unit 4 and a sub display unit 5. The vehicle-mounted equipment 1 also includes an execution unit 6 for executing navigation function and so on. Functions which can be executed by the execution unit 6 include, in addition to navigation function of guiding the vehicle, any types of functions such as an Audio/Video function of playing back a piece of music and a phone function of making a call.

The display controller 10 includes a main display control unit 11 that controls a display performed by the main display unit 3, a sub display control unit 12 that controls a display performed by the sub display unit 5, and an execution control unit 13 that controls an operation performed by the execution unit 6.

The main operation unit 2 receives operations performed by one or more occupants riding in the vehicle, generates main operation information showing the description of the operation, and outputs the main operation information to the main display control unit 11. This main operation unit 2 is, for example, an input device mounted in a center console of a vehicle disposed between the driver's seat and the front passenger seat. The input device can be any type of apparatus as long as it can receive an occupant's operation, such as a touch sensor, a button(s), a remote controller, or a voice recognition apparatus.

The main display unit 3 receives main display information from the main display control unit 11, and performs display on the basis of this main display information. This main display unit 3 is, for example, a display mounted in the center console of the vehicle disposed between the driver's seat and the front passenger seat. Further, for example, the touch panel which is the main operation unit 2 can be mounted on the display which is the main display unit 3.

The sub operation unit 4 receives an operation performed by one or more occupants riding in the vehicle, generates sub operation information showing the description of the operation, and outputs the sub operation information to the sub display control unit 12. This sub operation unit 4 is, for example, an input device exclusively used for the driver which is mounted in the steering wheel or the like in such a way that the driver can easily operate the input device even while performing a driving operation. The input device can be any type of apparatus as long as it can receive an operation performed by the driver or the like, such as a touch sensor, a button(s), a remote controller, or a voice recognition apparatus.

The sub display unit 5 receives sub display information from the sub display control unit 12, and performs display on the basis of this sub display information. This sub display unit 5 is a display mounted in such a way that the driver can easily and visually recognize the display even while performing a driving operation, for example, a display exclusively used for the driver which is mounted in the steering wheel or the like, or a meter display or head up display which is mounted in front of the driver's seat. Further, for example, the touch panel which is the sub operation unit 4 can be mounted on the display which is the sub display unit 5 and is mounted in the steering wheel.

The hardware of both the main operation unit 2 and the main display unit 3 and the hardware of both the sub operation unit 4 and the sub display unit 5 are not limited to the above-mentioned example. For example, a display for rear seat entertainment (RSE) mounted for a rear seat can be used as either the main display unit 3 or the sub display unit 5, and a touch panel, buttons, or the like for this RSE can be used as either the main operation unit 2 or the sub operation unit 4.

The main display control unit 11 receives the main operation information from the main operation unit 2, and outputs the main operation information to the execution control unit 13. The main display control unit 11 also receives either a result of execution performed by the execution unit 6 or the sub operation information of the sub operation unit 4 from the execution control unit 13, generates main display information on the basis of the information received thereby, and outputs the main display information to the main display unit 3.

The main display control unit 11 may also output a sound such as a touch sound or a guiding voice to a not-illustrated speaker in synchronization with display performed by the main display unit 3.

The sub display control unit 12 receives the sub operation information from the sub operation unit 4, and outputs the sub operation information to the execution control unit 13. The sub display control unit 12 also receives either a result of execution performed by the execution unit 6 or the main operation information of the main operation unit 2 from the execution control unit 13, generates sub display information on the basis of the information received thereby, and outputs the sub display information to the sub display unit 5.

The sub display control unit 12 can also output a sound such as a touch sound or a guiding voice to the not-illustrated speaker in synchronization with display performed by the sub display unit 5.

The execution control unit 13 receives the main operation information from the main display control unit 11 and outputs the main operation information to the sub display control unit 12, and outputs an instruction to execute a function, the instruction being based on the main operation information, to the execution unit 6. The execution control unit 13 also receives the sub operation information from the sub display control unit 12 and outputs the sub operation information to the main display control unit 11, and outputs an instruction to execute a function, the instruction being based on the sub operation information, to the execution unit 6. The execution control unit 13 further receives an execution result corresponding to an execution instruction from the execution unit 6, and outputs the execution result to either the main display control unit 11 or the sub display control unit 12.

The details of the main display control unit 11, the sub display control unit 12, and the execution control unit 13 will be explained below.

Next, examples of display performed by the main display unit 3 and of display performed by the sub display unit 5 under control of the display controller 10 will be explained.

Figure 2A:
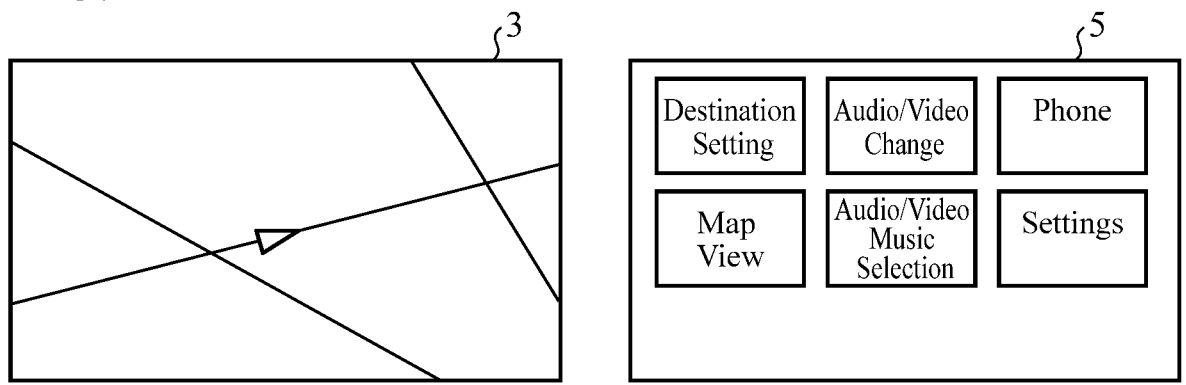
FIGS. 2A and 2B are diagrams showing an example of a display transition of a main display unit and a display transition of a sub display unit, in the display system according to Embodiment 1.
Figure 2B:
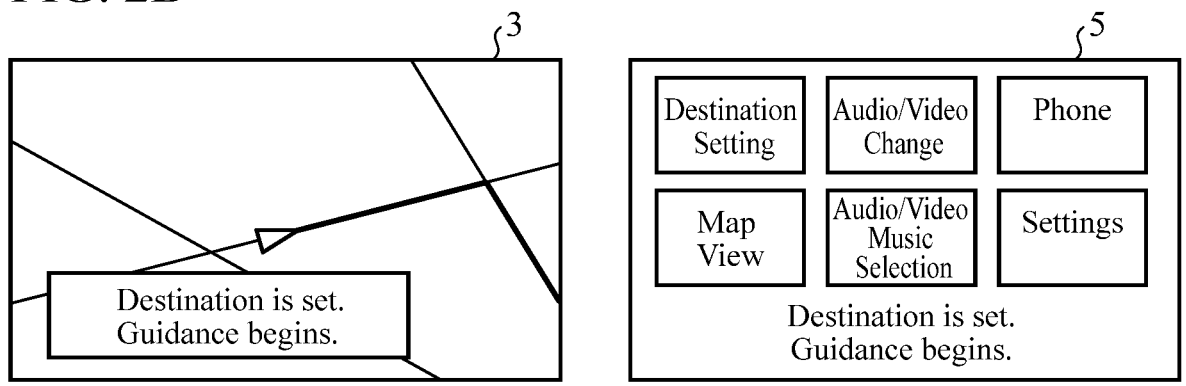

FIGS. 2A and 2B are diagrams showing an example of a display transition of the main display unit 3 and a display transition of the sub display unit 5 in the display system according to Embodiment 1. Hereafter, an example in which the sub operation unit 4 receives an operation in a state in which the main operation unit 2 is not receiving any operation will be explained.

Both the main display unit 3 and the sub display unit 5 which are shown in FIG. 2A display screens in a state in which neither the main operation unit 2 nor the sub operation unit 4 is receiving any operation. The main display unit 3 displays a map of an area including a current position, and this map display is included in the navigation function. On the other hand, the sub display unit 5 displays a menu in which operational items are arranged. Items "Destination Setting" and "Map Display" are included in the navigation function, items "Audio/Video Change" and "Audio/Video Music Selection" are included in the AV function, and an item "Phone" is included in the phone function. Further, the navigation function, the AV function, and the phone function are not related to one another.

When the sub operation unit 4 receives an operation on the item "Destination Setting" in the menu currently being displayed on the sub display unit 5 in the state shown in FIG. 2A, and, after that, a destination is selected through a series of operations following the operation, the main display unit 3 and the sub display unit 5 change from the displays shown in FIG. 2A to displays shown in FIG. 2B. Both the main display unit 3 and the sub display unit 5 which are shown in FIG. 2B display a notification showing that a destination is set, and the main display unit 3 further displays a route to the destination on the map.

Figure 3A:
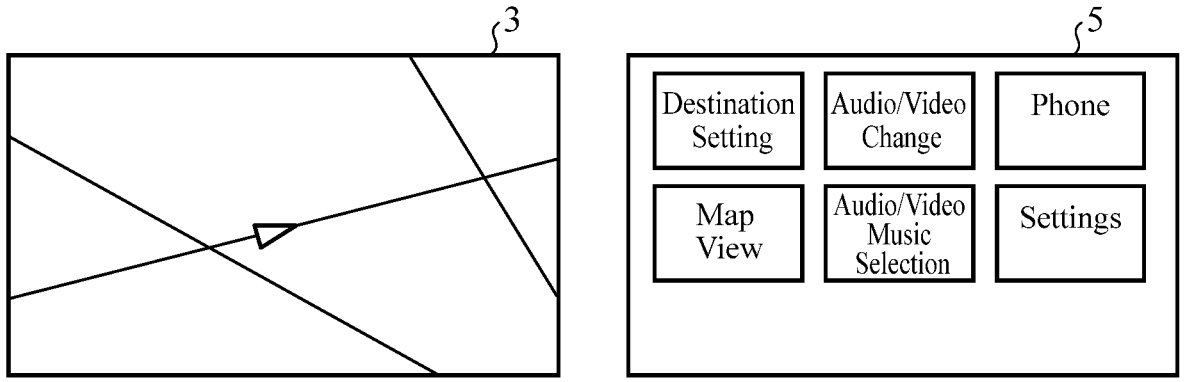
FIGS. 3A, 3B, and 3C are diagrams showing an example of one or more display transitions of the main display unit and one or more display transitions of the sub display unit, in the display system according to Embodiment 1.
Figure 3B:
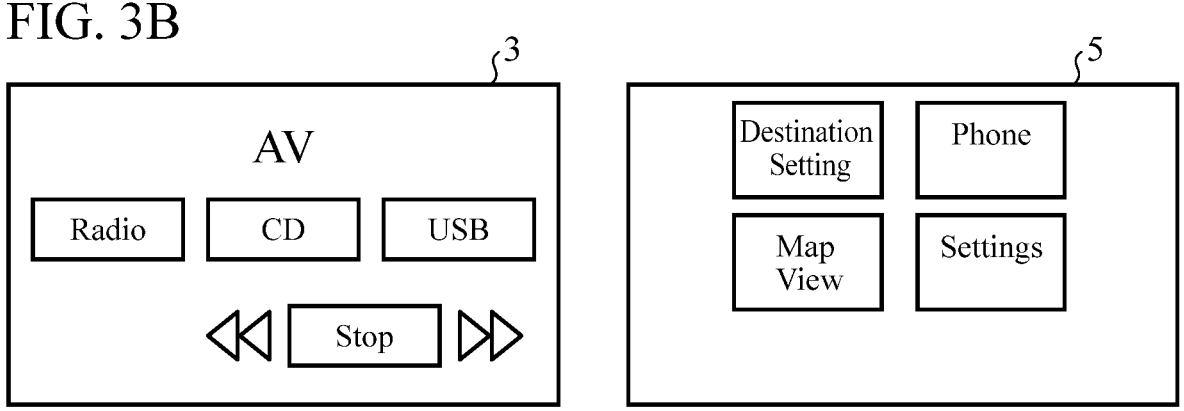
Figure 3C:
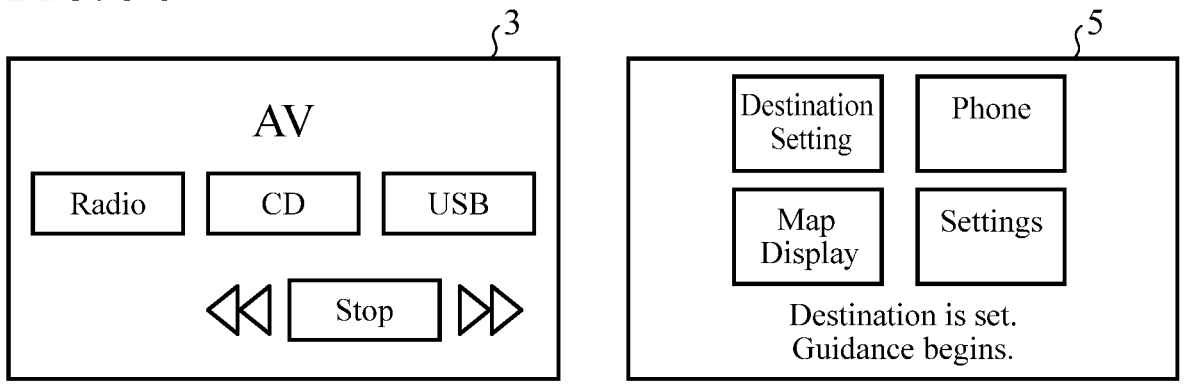

FIGS. 3A, 3B, and 3C are diagrams showing another example of a display transition of the main display unit 3 and a display transition of the sub display unit 5 in the display system according to Embodiment 1. Hereafter, an example in which when the main operation unit 2 is in the middle of receiving an operation, the sub operation unit 4 also receives an operation will be explained.

Both the main display unit 3 and the sub display unit 5 which are shown in FIG. 3A display screens in a state in which neither the main operation unit 2 nor the sub operation unit 4 is receiving any operation. The main display unit 3 displays a map of an area including the current position, and the sub display unit 5 displays a menu in which operational items are arranged.

When the main operation unit 2 starts receiving an operation related to the AV function in the state shown in FIG. 3A, the main display unit 3 and the sub display unit 5 change from the displays shown in FIG. 3A to displays shown in FIG. 3B. The main display unit 3 shown in FIG. 3B displays a menu in which operational items related to the AV function are arranged. On the other hand, the sub display unit 5 shown in FIG. 3B is caused not to display the items "Audio/Video Change" and "Audio/Video Music Change" related to the AV function so that the sub operation unit 4 is prohibited from receiving an operation related to the AV function.

When the sub operation unit 4 receives an operation on the item "Destination Setting" in the menu currently being displayed on the sub display unit 5 in the state shown in FIG. 3B, and, after that, a destination is selected through a series of operations following the operation, the sub display unit 5 changes from the display shown in FIG. 3B to a display shown in FIG. 3C. The sub display unit 5 shown in FIG. 3C displays a notification showing that a destination is set. On the other hand, because the main display unit 3 displays the AV function which are not related to the navigation function, the display is not changed between FIGS. 3B and 3C.

Figure 4:
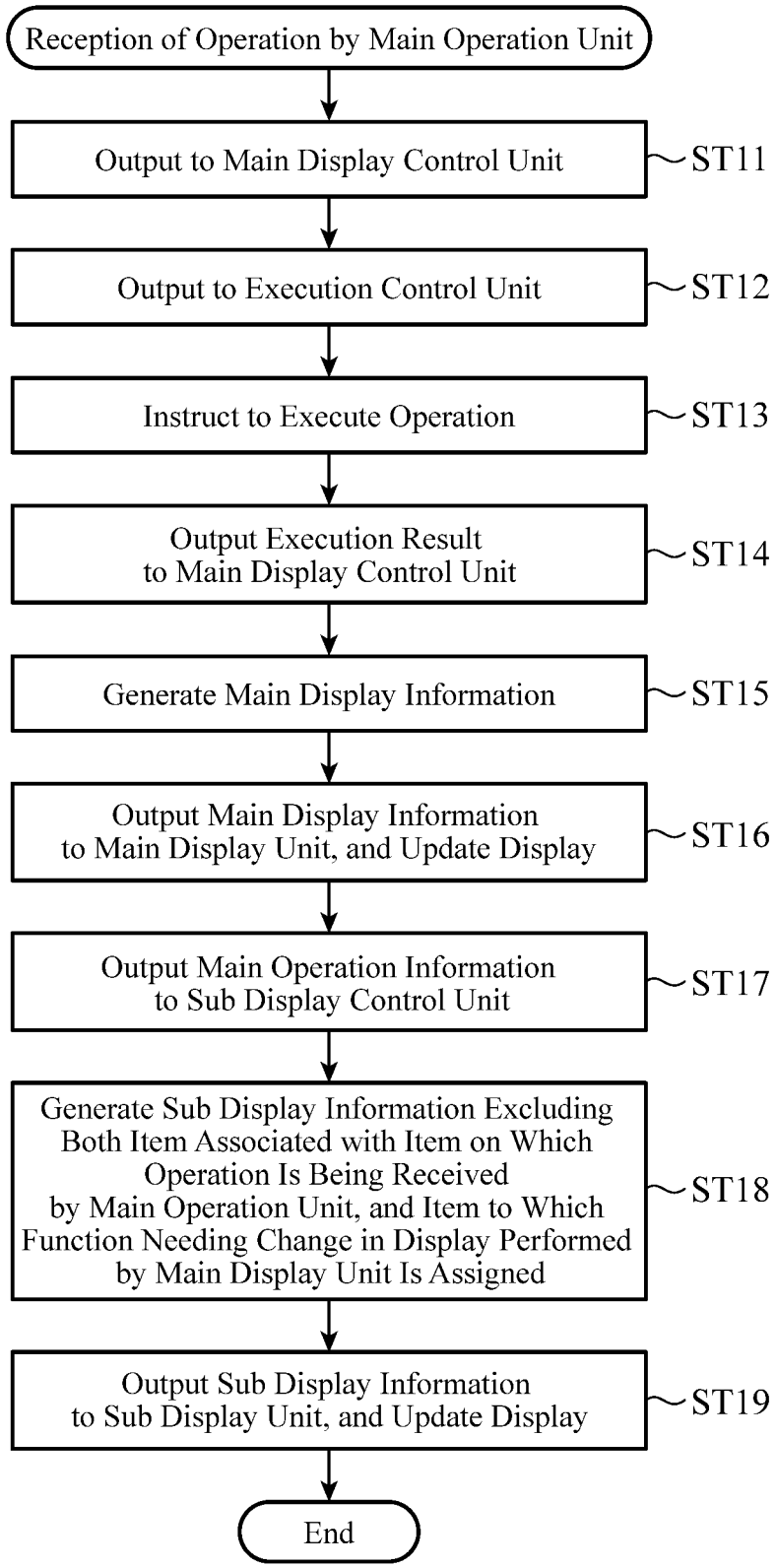
FIG. 4 is a flow chart showing operations of a display controller when a main operation unit receives an operation, in the display system according to Embodiment 1.
Figure 5:
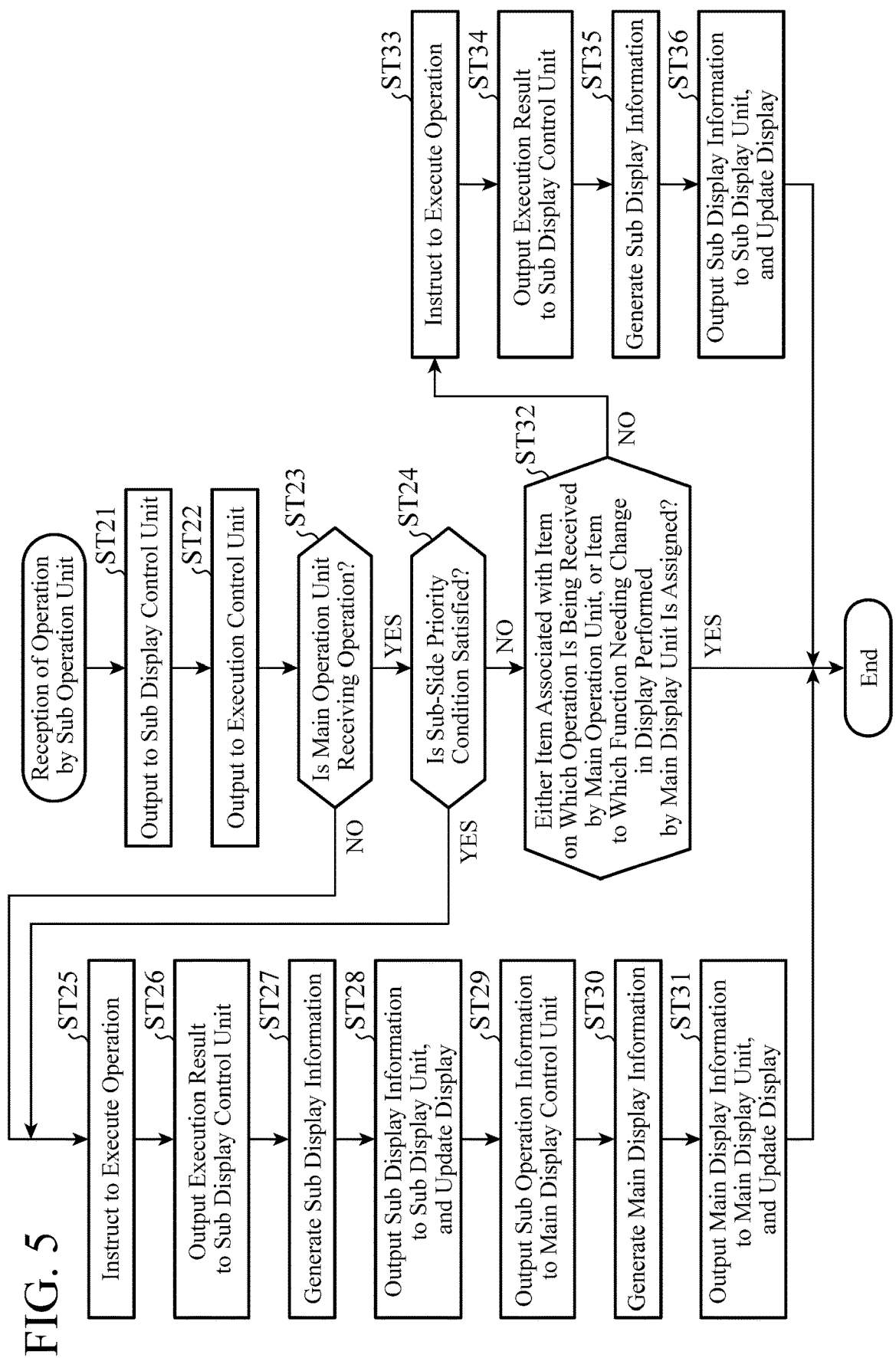
FIG. 5 is a flow chart showing operations of the display controller when a sub operation unit receives an operation, in the display system according to Embodiment 1.

Next, operations of the display controller 10 will be explained using flow charts shown in FIGS. 4 and 5. FIG. 4 is a flow chart showing an operation of the display controller 10 when the main operation unit 2 receives an operation. FIG. 5 is a flow chart showing an operation of the display controller 10 when the sub operation unit 4 receives an operation.

First, FIG. 4 will be explained.

When receiving an operation on an item, the main operation unit 2, in step ST11, generates main operation information showing the item, the operation on this item being received thereby, and outputs the main operation information to the main display control unit 11.

The main display control unit 11, in step ST12, outputs the main operation information received from the main operation unit 2 to the execution control unit 13.

The execution control unit 13, in step ST13, outputs an execution instruction to execute the function assigned to the item shown by the main operation information received from the main display control unit 11 to the execution unit 6. The execution control unit 13 then receives an execution result which the execution unit 6 acquires by executing the function in accordance with this execution instruction from the execution unit 6.

The execution control unit 13, in step ST14, outputs the execution result received from the execution unit 6 to the main display control unit 11.

The main display control unit 11, in step ST15, generates main display information to be displayed on the main display unit 3 on the basis of the execution result received from the execution control unit 13.

The main display control unit 11, in step ST16, outputs the main display information to the main display unit 3. The main display unit 3 receives the main display information from the main display control unit 11 and updates the display.

In step ST17, the execution control unit 13 outputs the main operation information showing an item to which an operation is being received by the main operation unit 2, to the sub display control unit 12.

Here, the expression "operation is being received" may refer to being within a predetermined time period from the last input to the main operation unit 2, or to being in the middle of a series of operations relating to a function. Taking the AV function as an example, the "series of operations relating to a function" includes, for example, a series of operations from an operation of selecting a source to be played back from a radio, a compact disc (CD), a universal serial bus (USB) memory, or the like up to an operation of finally ending the selection of a channel or a piece of music.

The sub display control unit 12, in step ST18, generates sub display information about items excluding, among the items of the sub display information which the sub display control unit causes the sub display unit 5 to currently display, both items associated with an item on which an operation is being received by the main operation unit 2, and items to which a function needing a change in display performed by the main display unit 3 is assigned, on the basis of the main operation information received from the execution control unit 13.

The "items associated with an item on which an operation is being received by the main operation unit 2" are, for example, ones such as "Audio/Video Change" and "Audio/Video Music Selection" which are included in the AV function. Further, for example, the items such as "Audio/Video Change" and "Audio/Video Music Selection" which are included in the AV function are not related to the items such as "Destination Setting" and "Map Display" which are included in the navigation function.

Further, the "items to which a function needing a change in display performed by the main display unit 3 is assigned" are, for example, ones such as "Audio/Video Change" and "Audio/Video Music Selection" which are included in the AV function when the main display unit 3 displays the menu in which the operational items shown in FIG. 3C and related to the AV function are arranged.

However, the sub display control unit 12 does not exclude, among the items of the sub display information which the sub display control unit causes the sub display unit 5 to currently display, items each satisfying a predetermined sub-side priority condition from the sub display information even though each of the items satisfies the above-mentioned condition.

An item satisfying the sub-side priority condition is one to which a function of displaying information which the driver who operates the sub operation unit 4 uses when driving the vehicle is assigned. The information used when driving is, for example, lane guidance, intersection guidance, junction guidance, waypoint arrival guidance, or destination arrival guidance which is provided at a time of route guidance using the navigation function. Further, the information used when driving can be, for example, guidance of road traffic information, such as traffic disturbance information or traffic restriction information, which is delivered from Vehicle Information and Communication System (VICS, registered trademark) or the like to the vehicle, warning guidance for urging to pay attention to a collision at an intersection or a rear-end collision, or emergency guidance at a time when a disaster such as an earthquake occurs.

As a result, in the case in which the sub operation unit 4 and the sub display unit 5 are mounted for the driver, display of guidance provided by the navigation function, such as intersection guidance, can be performed at a timing required by the driver regardless of the operation state of the main operation unit 2 and the display state of the main display unit 3. Therefore, an operation on the main operation unit 2 and a display on the main display unit 3 are prevented from interfering with the guidance of a route for the driver.

The sub display control unit 12, in step ST19, outputs the sub display information to the sub display unit 5. The sub display unit 5 receives the sub display information from the sub display control unit 12 and updates the display. The display controller 10 then ends the series of processes shown in FIG. 4.

As a result, among the items currently being displayed on the sub display unit 5, items relating to an item to which an operation is being received by the main operation unit 2, and items assigned to a function that requires a change in display performed by the main display unit 3 are not displayed any longer, so that these items are prohibited from being operated. Therefore, a malfunction of the execution unit 6 and a non-intended display transition of the main display unit 3 which are caused by simultaneous performance of an operation on the main operation unit 2 and an operation on the sub operation unit 4 can be prevented.

On the other hand, among the items previously displayed on the sub display unit 5, the items other than both the items relating to the item to which an operation is being received by the main operation unit 2, and the items assigned to the function that requires a change in display performed by the main display unit 3 are displayed, so that the other items are allowed to be operated. Therefore, with respect to these items, while a malfunction of the execution unit 6 and a non-intended display transition of the main display unit 3 can be prevented, an operation on the main operation unit 2 and an operation on the sub operation unit 4 can be simultaneously performed.

Next, FIG. 5 will be explained.

When receiving an operation on an item, the sub operation unit 4, in step ST21, generates sub operation information showing the item, the operation on this item being received thereby, and outputs the sub operation information to the sub display control unit 12.

The sub display control unit 12, in step ST22, outputs the sub operation information received from the sub operation unit 4 to the execution control unit 13.

The execution control unit 13, in step ST23, determines whether or not the main operation unit 2 is receiving an operation on the basis of the main operation information which the execution control unit has received from the main display control unit 11 before this time. When the main operation unit 2 is receiving an operation (when "YES" in step ST23) the execution control unit 13 advances to step ST24, whereas when the main operation unit 2 is not receiving any operation (when "NO" in step ST23) the execution control unit 13 advances to step ST25.

The execution control unit 13, in step ST24, determines whether the item shown by the sub operation information received from the sub display control unit 12 satisfies a predetermined sub-side priority condition. The sub-side priority condition is the same as that of the sub display control unit 12 which is explained in step ST18 of FIG. 4.

When the item shown by the sub operation information satisfies the sub-side priority condition (when "YES" in step ST24), the execution control unit 13 advances to step ST25, whereas when the item shown by the sub operation information does not satisfy the sub-side priority condition (when "NO" in step ST24), the execution control unit 13 advances to step ST32.

The execution control unit 13, in step ST25, outputs an execution instruction to execute the function assigned to the item shown by the sub operation information received from the sub display control unit 12 to the execution unit 6. The execution control unit 13 then receives an execution result which the execution unit 6 acquires by executing the function in accordance with this execution instruction from the execution unit 6.

The execution control unit 13, in step ST26, outputs the execution result received from the execution unit 6 to the sub display control unit 12.

The sub display control unit 12, in step ST27, generates sub display information to be displayed on the sub display unit 5 on the basis of the execution result received from the execution control unit 13.

The sub display control unit 12, in step ST28, outputs the sub display information to the sub display unit 5. The sub display unit 5 receives the sub display information from the sub display control unit 12 and updates the display.

The execution control unit 13, in step ST29, generates sub operation information showing the item corresponding to the function executed in steps ST25 and ST26, and outputs the sub operation information to the main display control unit 11.

The main display control unit 11, in step ST30, generates main display information to be displayed on the main display unit 3 on the basis of the sub operation information received from the execution control unit 13.

The main display control unit 11, in step ST31, outputs the main display information to the main display unit 3. The main display unit 3 receives the main display information from the main display control unit 11 and updates the display. The display controller 10 then ends the series of processes shown in FIG. 5.

The execution control unit 13, in step ST32, determines whether the item shown by the sub operation information received from the sub display control unit 12 is either an item associated with an item on which an operation is being received by the main operation Unit 2, or an item to which a function needing a change in display performed by the main display unit 3 is assigned, on the basis of the main operation information which the execution control unit has received from the main display control unit 11 before this time. When the item shown by the sub operation information satisfies the above-mentioned condition (when "YES" in step ST32), the execution control unit 13 ends the series of processes shown in FIG. 5, whereas when the item shown by the sub operation information does not satisfy the above-mentioned condition (when "NO" in step ST32), the execution control unit 13 advances to step ST33.

The execution control unit 13, in step ST33, outputs an execution instruction to execute the function assigned to the item shown by the sub operation information received from the sub display control unit 12 to the execution unit 6. The execution control unit 13 then receives an execution result which the execution unit 6 acquires by executing the function in accordance with this execution instruction from the execution unit 6.

As a result, among the functions assigned to the items currently being displayed on the sub display unit 5, both a function assigned to items related to an item on which an operation is currently being received by the main operation unit 2, and a function needing a change in display performed by the main display unit 3 are not executed. Therefore, with respect to these items, a malfunction of the execution unit 6 and a non-intended display transition of the main display unit 3 which are caused by simultaneous performance of an operation on the main operation unit 2 and an operation on the sub operation unit 4 can be prevented.

On the other hand, among the functions assigned to the items currently being displayed on the sub display unit 5, functions other than both a function assigned to items related to an item on which an operation is currently being received by the main operation unit 2, and a function needing a change in display performed by the main display unit 3 are executed. Therefore, while a malfunction of the execution unit 6 and a non-intended display transition of the main display unit 3 can be prevented, an operation on the main operation unit 2 and an operation on the sub operation unit 4 can be simultaneously performed.

The execution control unit 13, in step ST34, outputs the execution result received from the execution unit 6 to the sub display control unit 12.

The sub display control unit 12, in step ST35, generates sub display information to be displayed on the sub display unit 5 on the basis of the execution result received from the execution control unit 13.

The sub display control unit 12, in step ST36, outputs the sub display information to the sub display unit 5. The sub display unit 5 receives the sub display information from the sub display control unit 12 and updates the display. The display controller 10 then ends the series of processes shown in FIG. 5.

As explained above, the display controller 10 according to Embodiment 1 is configured so as to include the main display control unit 11 that controls display performed by the main display unit 3 on the basis of main operation information from the main operation unit 2, and the sub display control unit 12 that controls display performed by the sub display unit 5 on the basis of sub operation information from the sub operation unit 4. This sub display control unit 12 performs on the basis of the main operation information a control operation of, when the main operation unit 2 is receiving an operation, not displaying, among the items which the sub display control unit causes the sub display unit 5 to currently display, either the items related to an item to which an operation is being received by the main operation unit 2, or the items to which the functions needing a change in display performed by the main display unit 3 are assigned. As a result, cooperation can be established between the main operation unit 2 and the main display unit 3, and the sub operation unit 4 and the sub display unit 5 while interference between the main operation unit and the main display unit, and the sub operation unit and the sub display unit is prevented. Therefore, an operation on the main operation unit 2 and an operation on the sub operation unit 4 can be simultaneously performed, and the convenience can be improved.

Further, the display controller 10 according to Embodiment 1 is configured so as to include the execution control unit 13 that controls the execution unit 6 in such a way that the execution unit executes the function assigned to an item, an operation on this item being received by the main operation unit 2, and the function assigned to an item, an operation on this item being received by the sub operation unit 4, on the basis of the main operation information and the sub operation information. This execution control unit 13 performs a control operation of, when the main operation unit 2 is receiving an operation, controlling the execution unit 6 in such a way that the execution unit does not execute, among the functions assigned to the items which the sub display control unit 12 causes the sub display unit 5 to currently display, both the functions assigned to the items related to an item to which an operation is being received by the main operation unit 2, and the functions needing a change in display performed by the main display unit 3. As a result, cooperation can be established between the main operation unit 2 and the main display unit 3, and the sub operation unit 4 and the sub display unit 5 while interference between the main operation unit and the main display unit, and the sub operation unit and the sub display unit is prevented more surely.

Although in the example shown in FIG. 1 the display controller 10 is configured so as to include both the sub display control unit 12 that prohibits the display of both the items related to an item to which an operation is being received by the main operation unit 2, and the items to which the functions needing a change in display performed by the main display unit 3 are assigned, and the execution control unit 13 that prohibits the execution of any of the functions assigned to the above-mentioned items, the present embodiment is not limited to this configuration.

For example, there can be considered an example in which the sub operation unit 4 can receive only an operation on one of the items currently being displayed on the sub display unit 5, but does not receive an operation on an item which is not displayed on the sub display unit. In this example, even though the control operation of prohibiting execution is not performed by the execution control unit 13, and the execution unit 6 is configured so as to be able to execute all the functions assigned to the items currently being displayed on the sub display unit 5, interference can be prevented because no items which cause interference between the main operation unit 2 and the main display unit 3, and the sub operation unit 4 and the sub display unit 5 are displayed from the beginning. In a case in which the need for the execution control unit 13 is eliminated, what is necessary is just to, for example, output pieces of operation information from the main display control unit 11 and the sub display control unit 12 directly to the execution unit 6.

Further, according to Embodiment 1, the sub display control unit 12 is configured so as to, if the predetermined sub-side priority condition is satisfied even when the main operation unit 2 is receiving an operation, on the basis of the main operation information, cause the sub display unit 5 to display both the items related to an item to which an operation is being received by the main operation unit 2, and the items to which the functions needing a change in display performed by the main display unit 3 are assigned. In a state in which display performed by the sub display unit 5 is needed, a higher priority can be given to an operation on the sub operation unit 4 regardless of the operation state of the main operation unit 2 and the display state of the main display unit 3, and the convenience can be further improved.

Further, according to Embodiment 1, the execution control unit 13 is configured so as to, if the predetermined sub-side priority condition is satisfied even when the main operation unit 2 is receiving an operation, allow the execution unit 6 to execute any of both the functions assigned to the items related to an item to which an operation is being received by the main operation unit 2, and the functions needing a change in display performed by the main display unit 3. In the state in which display performed by the sub display unit 5 is needed, a higher priority can be given to an operation on the sub operation unit 4 regardless of the operation state of the main operation unit 2 and the display state of the main display unit 3, and the convenience can be further improved.

Further, according to Embodiment 1, the case in which the predetermined sub-side priority condition is satisfied is one in which either an item currently being displayed on the sub display unit 5 or an item, an operation on this item being received by the sub operation unit 4, is one to which a function of displaying lane guidance, intersection guidance, junction guidance, waypoint arrival guidance, destination arrival guidance, road traffic information guidance, warning guidance, or emergency guidance is assigned. As a result, in the case in which the sub operation unit 4 and the sub display unit 5 are mounted for the driver, the information which the driver uses when driving the vehicle can be displayed at a timing required by the driver, and the convenience can be improved.

Embodiment 2

Figure 6:
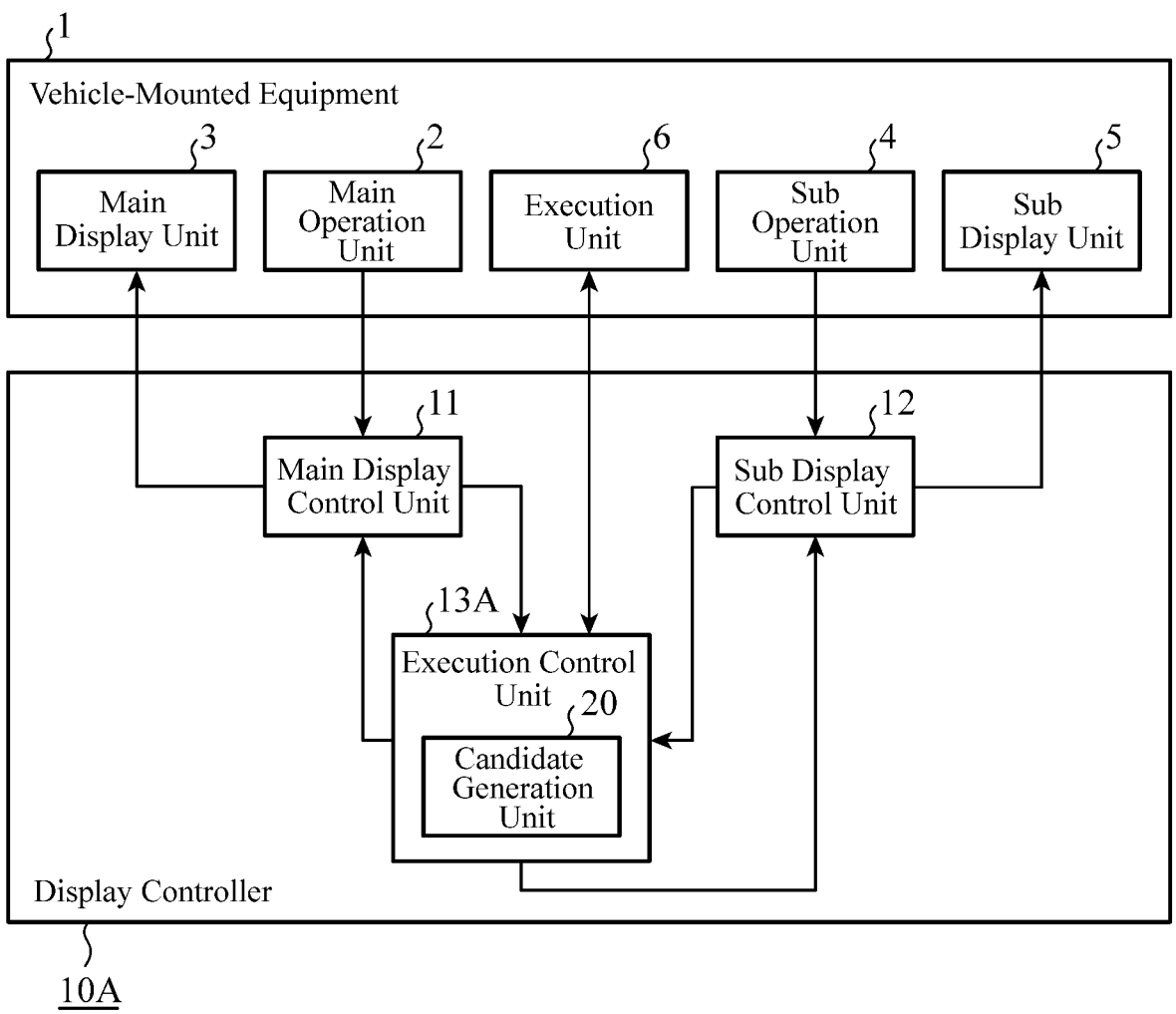
FIG. 6 is a block diagram showing an exemplary configuration of a display system according to Embodiment 2 of the present disclosure.

FIG. 6 is a block diagram showing an exemplary configuration of a display controller 10A according to Embodiment 2. The display controller 10A according to Embodiment 2 has a configuration in which a candidate generation unit 20 is added into the execution control unit 13 of the display controller 10 according to above-mentioned Embodiment 1. Among components other than this component, the same components as those shown in FIG. 1 or like components are designated by the same reference numerals, and the explanation of the components will be omitted hereafter.

The candidate generation unit 20 generates a candidate list of items to which a function executable by an execution unit 6 of vehicle-mounted equipment 1 is assigned. For example, in an example in which a sub operation unit 4 and a sub display unit 5 are mounted for the driver, the candidate generation unit 20 recommends candidates of items having a high possibility that the driver operates them. The number of item candidates which are recommended can be one and more. Further, the candidate generation unit 20 can update the candidate list either at predetermined time intervals or when a predetermined update condition is satisfied. The predetermined update condition is, for example, one in which the state of the vehicle has changed because of an approach to an intersection, or the like, or one in which the execution unit 6 has executed a certain function and the state of the vehicle-mounted equipment 1 has changed.

The candidate generation unit 20 acquires vehicle sensor information such as the position or speed of the vehicle from various sensors mounted in the vehicle, and generates a candidate list of items on the basis of a correspondence between pieces of predetermined vehicle sensor information and item candidates. Instead, the candidate generation unit 20 can determine the state of the vehicle-mounted equipment 1 which is based on an execution result acquired by the execution unit 6, such as the presence or absence of a destination setting or the presence or absence of a music playback, or the like, and generate a candidate list of items on the basis of a correspondence between predetermined states of the vehicle-mounted equipment 1 and item candidates.

Instead, the candidate generation unit 20 can learn a correspondence between an item, an operation on this item being received by the sub operation unit 4, and either vehicle sensor information or the state of the vehicle-mounted equipment 1 at the time that the operation is received, and generate a candidate list of items on the basis of a result of the learning.

Instead, the candidate generation unit 20 can acquire a learning result acquired by a display controller 10A mounted in another vehicle, and generate a candidate list of items on the basis of the learning result.

The method of generating a candidate list of items is not limited to the above-mentioned methods, and any type of method can be used as long as a candidate list of items to which a function executable by the execution unit 6 is assigned can be generated.

An execution control unit 13A deletes, among the items included in the candidate list generated by the candidate generation unit 20, both the items related to an item to which an operation is being received by a main operation unit 2, and the items to which functions needing a change in display performed by a main display unit 3 are assigned, on the basis of both main operation information received from a main display control unit 11 and sub operation information received from a sub display control unit 12. The execution control unit 13A then outputs the candidate list after item deletion to the sub display control unit 12.

However, even when the main operation unit 2 is receiving an operation, the execution control unit 13A does not exclude, among the items included in the candidate list, items each satisfying a predetermined sub-side priority condition from the candidate list even though each of the items satisfies the above-mentioned condition. The sub-side priority condition is the same as the sub-side priority condition of the sub display control unit 12, which is explained in step ST18 shown in FIG. 4 of above-mentioned Embodiment 1, and the sub-side priority condition of the execution control unit 13 which is explained in step ST24 shown in FIG. 5.

The sub display control unit 12 receives the candidate list after item deletion from the execution control unit 13A, generates sub display information on the basis of this candidate list, and outputs the sub display information to the sub display unit 5. The sub display unit 5 receives the sub display information from the sub display control unit 12 and updates the display.

Next, examples of display performed by the main display unit 3 and of display performed by the sub display unit 5 under control of the display controller 10A will be explained. In the following explanation, it is assumed that the sub display unit 5 is intended for display of the candidate list, and a map and so on other than the candidate list are displayed on the main display unit 3.

Figure 7A:
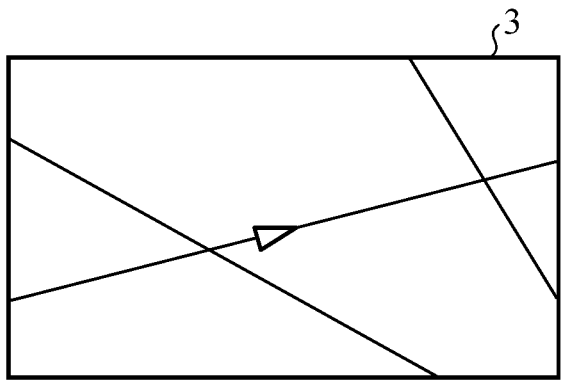
FIGS. 7A and 7B are diagrams showing an example of a display transition of a main display unit and a display transition of a sub display unit, in the display system according to Embodiment 2.
Figure 7B:
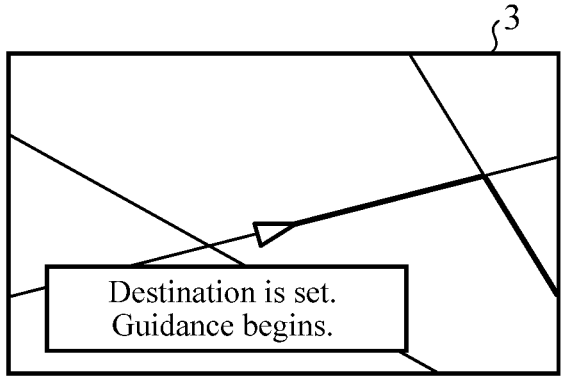

FIGS. 7A and 7B are diagrams showing an example of a display transition of the main display unit 3 and a display transition of the sub display unit 5 in the display system according to Embodiment 2. Hereafter, an example in which the sub operation unit 4 receives an operation in a state in which the main operation unit 2 is not receiving any operation will be explained.

The main display unit 3 and the sub display unit 5 which are shown in FIG. 7A display screens in a state in which neither the main operation unit 2 nor the sub operation unit 4 is receiving any operation. The main display unit 3 displays a map of an area including a current position. On the other hand, the sub display unit 5 displays the following three items in the candidate list: "(1) Set Home as Destination", "(2) Enlarge Display of Map", and "(3) Play Radio".

When the sub operation unit 4 receives an operation on the item "(1) Set Home as Destination" currently being displayed on the sub display unit 5 in the state shown in FIG. 7A, the main display unit 3 and the sub display unit 5 change from the displays shown in FIG. 7A to displays shown in FIG. 7B. Both the main display unit 3 and the sub display unit 5 which are shown in FIG. 7B display a notification showing that a destination is set. Further, the main display unit 3 displays a route to the destination on the map, and the sub display unit 5 updates the display of the items in the candidate list.

Figure 8A:
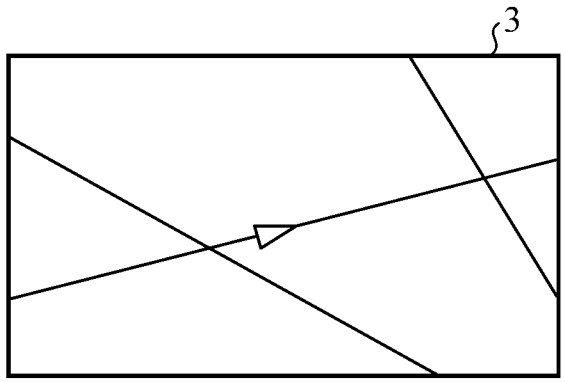
FIGS. 8A, 8B, and 8C are diagrams showing an example of one or more display transitions of the main display unit and one or more display transitions of the sub display unit, in the display system according to Embodiment 2.
Figure 8B:
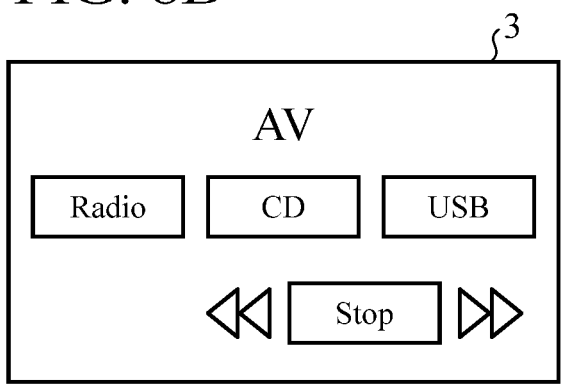
Figure 8C:
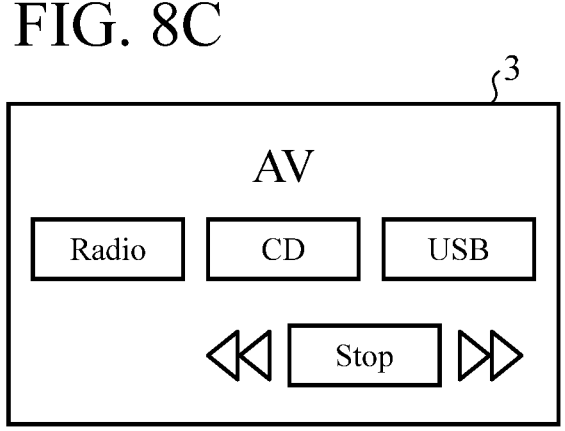

FIGS. 8A, 8B, and 8C are diagrams showing another example of a display transition of the main display unit 3 and a display transition of the sub display unit 5 in the display system according to Embodiment 2. Hereafter, an example in which when the main operation unit 2 is receiving an operation, the sub operation unit 4 also receives an operation will be explained.

The main display unit 3 and the sub display unit 5 which are shown in FIG. 8A display screens in a state in which neither the main operation unit 2 nor the sub operation unit 4 is receiving any operation. The main display unit 3 displays a map of an area including the current position, and the sub display unit 5 displays three items in the candidate list.

When the main operation unit 2 starts receiving an operation related to an AV function in the state shown in FIG. 8A, the main display unit 3 and the sub display unit 5 change from the displays shown in FIG. 8A to displays shown in FIG. 8B. The main display unit 3 shown in FIG. 8B displays a menu in which operational items related to the AV function are arranged. On the other hand, in the sub display unit 5 shown in FIG. 8B, the display of both the item "(3) Play Radio" related to the AV function to which an operation is being received by the main operation unit 2, and the item "(2) Enlarge Display of Map" needing a change in the display of FIG. 8B performed by the main operation unit 2 are not displayed. Then, among the items included in the candidate list generated by the candidate generation unit 20, items which are not related to the AV function to which an operation is being received by the main operation unit 2, and which do not cause a change in display performed by the main display unit 3 are displayed on the sub display unit 5.

When the sub operation unit 4 receives an operation on the item "(1) Set Home as Destination" in the candidate list currently being displayed on the sub display unit 5 in the state shown in FIG. 8B, the main display unit 3 and the sub display unit 5 change from the displays shown in FIG. 8B to displays shown in FIG. 8C. In the sub display unit 5 shown in FIG. 8C, the item "(1) Set Home as Destination" is not displayed because the function assigned to the item has been executed. Then, among the items included in the candidate list generated by the candidate generation unit 20, items which are not related to the AV function to which an operation is being received by the main operation unit 2, and which do not cause a change in display performed by the main display unit 3 are displayed on the sub display unit 5. On the other hand, because the main display unit 3 displays the AV function which is not related to the item "(1) Set Home as Destination", the display is not changed between FIGS. 8B and 8C.

Figure 10:
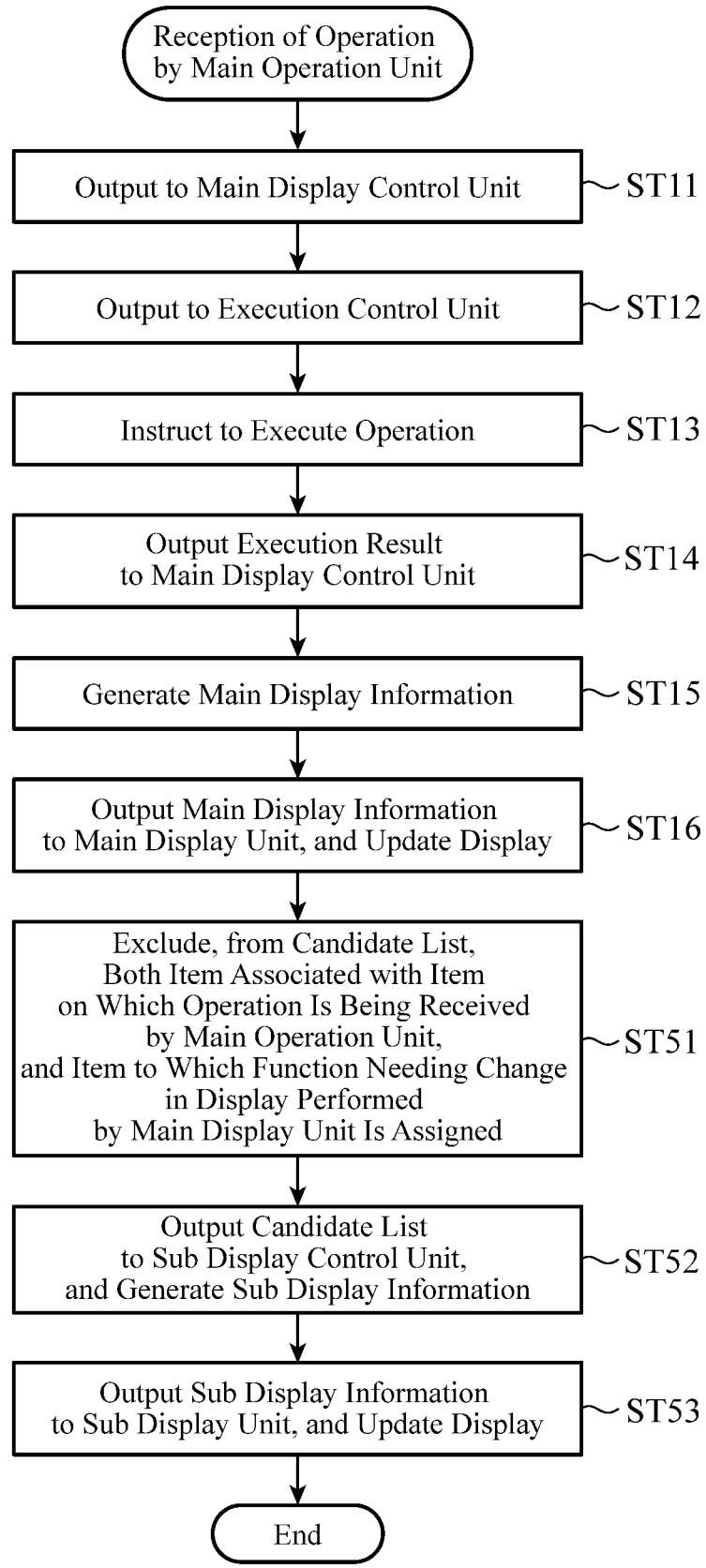
FIG. 10 is a flow chart showing operations of the display controller when a main operation unit receives an operation, in the display system according to Embodiment 2.
Figure 11:
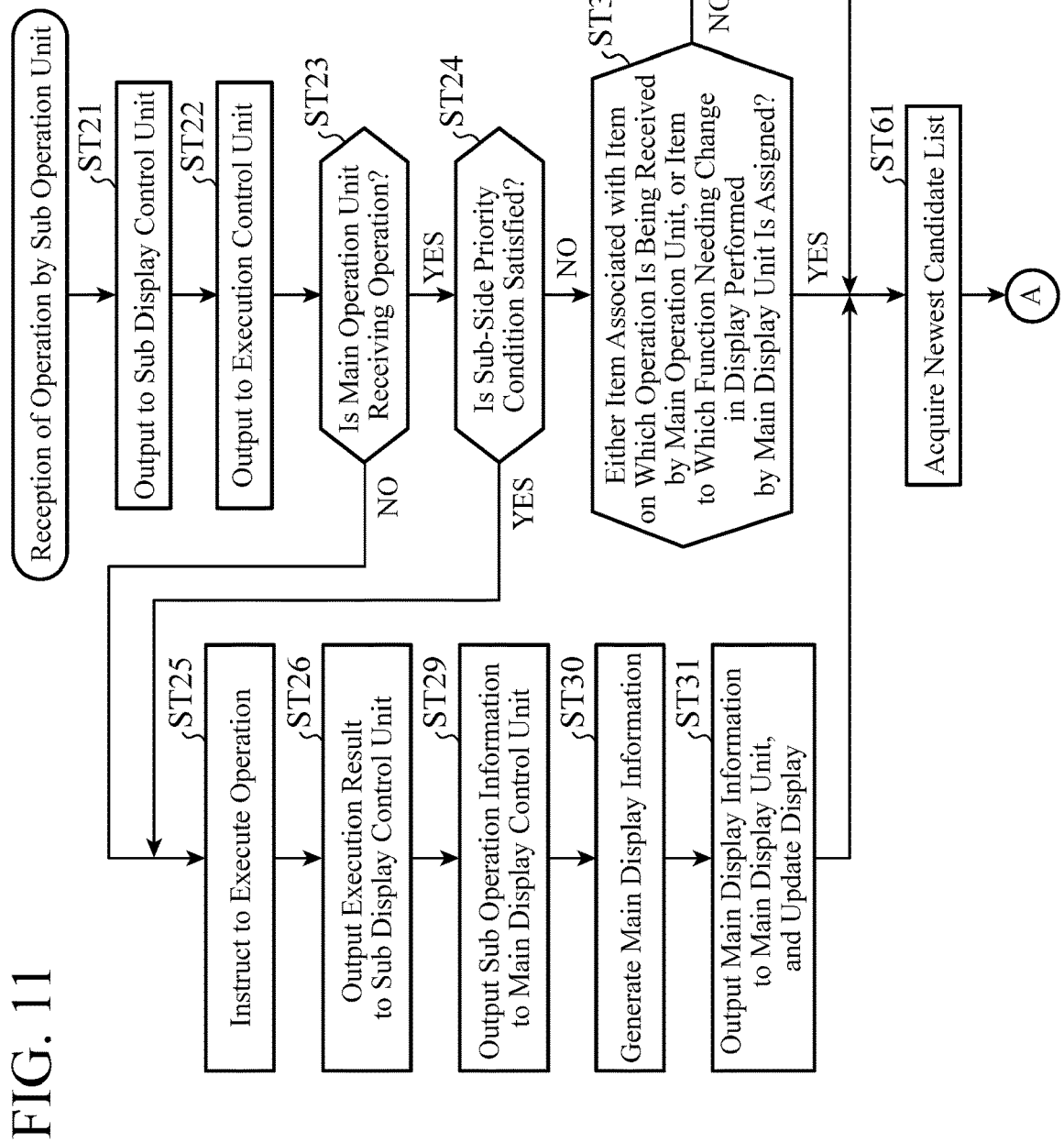
FIG. 11 is a flow chart showing operations of the display controller when a sub operation unit receives an operation, in the display system according to Embodiment 2.

Next, operations of the display controller 10A will be explained using flow charts shown in FIGS. 9, 10, and 11. FIG. 9 is a flow chart showing an operation of the display controller 10A when the candidate generation unit 20 updates the candidate list. FIG. 10 is a flow chart showing an operation of the display controller 10A when the main operation unit 2 receives an operation. FIG. 11 is a flow chart showing an operation of the display controller 10A when the sub operation unit 4 receives an operation.

First, FIG. 9 will be explained.

Hereafter, it is assumed that the candidate generation unit 20 updates the candidate list at predetermined time intervals.

When the candidate generation unit 20 updates the candidate list, the execution control unit 13A, in step ST41, determines whether or not the main operation unit 2 is receiving an operation on the basis of the main operation information which the execution control unit has received from the main display control unit 11 before this time. When the main operation unit 2 is receiving an operation (when "YES" in step ST41), the execution control unit 13A advances to step ST42, whereas when the main operation unit 2 is not receiving any operation (when "NO" in step ST41), the execution control unit 13A advances to step ST43.

The execution control unit 13A, in step ST42, excludes, among the items included in the newest candidate list, both the items related to an item to which an operation is being received by the main operation unit 2, and the items to which the functions needing a change in display performed by the main display unit 3 are assigned, on the basis of the main operation information which the execution control unit has received from the main display control unit 11 before this time.

However, the execution control unit 13A does not exclude items each satisfying the sub-side priority condition from among the items included in the candidate list acquired.

The execution control unit 13A, in step ST43, outputs the candidate list on which the process of deleting items is performed in step ST42 to the sub display control unit 12. The sub display control unit 12 generates sub display information to be displayed on the sub display unit 5 on the basis of the candidate list received from the execution control unit 13A.

The sub display control unit 12, in step ST44, outputs the sub display information generated thereby to the sub display unit 5. The sub display unit 5 receives the sub display information from the sub display control unit 12 and updates the display. The display controller 10A then ends the series of processes shown in FIG. 9.

Next, FIG. 10 will be explained.

Because the processes of steps ST11 to ST16 of FIG. 10 are the same as those of steps ST11 to ST16 of FIG. 4, the explanation of the processes will be omitted hereafter.

The execution control unit 13A, in step ST51, excludes, among the items included in the newest candidate list generated by the candidate generation unit 20, both the items related to items to which an operation is being received by the main operation unit 2, and the items to which the functions needing a change in display performed by the main display unit 3 are assigned, on the basis of the main operation information which the execution control unit has received from the main display control unit 11.

However, the execution control unit 13A does not exclude items each satisfying the sub-side priority condition from among the items included in the candidate list acquired.

The execution control unit 13A, in step ST52, outputs the candidate list on which the process of deleting items is performed in step ST51 to the sub display control unit 12. The sub display control unit 12 generates sub display information to be displayed on the sub display unit 5 on the basis of the candidate list received from the execution control unit 13A.

The sub display control unit 12, in step ST53, outputs the sub display information generated thereby to the sub display unit 5. The sub display unit 5 receives the sub display information from the sub display control unit 12 and updates the display. The display controller 10A then ends the series of processes shown in FIG. 10.

Next, FIG. 11 will be explained.

Processes in steps ST21 to ST34 of FIG. 11 are the same as those in steps ST21 to ST34 of FIG. 5, and the execution of a function assigned to an item to which an operation is received by the sub operation unit 4, and an update of display performed by the main display unit 3 are carried out in the steps. In next step ST61 and subsequent steps, an update of the candidate list and an update of display performed by the sub display unit 5 are carried out.

The execution control unit 13A, in step ST61, acquires the newest candidate list from the candidate generation unit 20. After that, the execution control unit 13A and the sub display control unit 12 perform the same processes as those in steps ST41 to ST44 of FIG. 9.

However, the execution control unit 13A can determine twice whether or not the main operation unit 2 is receiving an operation in steps ST23 and ST41, or can use a result of the determination of step ST23, just as it is, in step ST41.

Further, when, in step ST26 or ST34, receiving a result of the execution from the execution control unit 13A, the sub display control unit 12, in subsequent step ST43, generates sub display information to be displayed on the sub display unit 5 on the basis of both the execution result and the candidate list after item deletion received from the execution control unit 13A.

As explained above, the display controller 10A according to Embodiment 2 is configured so as to include the candidate generation unit 20 that generates a candidate list for an item to which a function executable by the execution unit 6 is assigned. When the main operation unit 2 is receiving an operation, the execution control unit 13A deletes, from the candidate list generated by the candidate generation unit 20, both the items related to an item to which an operation is being received by the main operation unit 2, and the items to which the functions needing a change in display performed the main display unit 3 are assigned, and outputs the candidate list to the sub display control unit 12. The sub display control unit 12 controls the items to be displayed on the sub display unit 5 on the basis of the candidate list outputted by the execution control unit 13A. As a result, in the case in which the sub display unit 5 is configured so as to display the candidate list, cooperation can be established between the main operation unit 2 and the main display unit 3, and the sub operation unit 4 and the sub display unit 5 while interference between the main operation unit and the main display unit, and the sub operation unit and the sub display unit is prevented. Therefore, an operation on the main operation unit 2 and an operation on the sub operation unit 4 can be simultaneously performed, and the convenience can be improved.

Further, the execution control unit 13A according to Embodiment 2 is configured so as not to, if the predetermined sub-side priority condition is satisfied even when the main operation unit 2 is receiving an operation, delete, from the candidate list generated by the candidate generation unit 20, both the items related to an item to which an operation is being received by the main operation unit 2, and the items to which the functions needing a change in display performed the main display unit 3 are assigned. In the state in which a display performed by the sub display unit 5 is needed, a higher priority can be given to an operation on the sub operation unit 4 regardless of the operation state of the main operation unit 2 and the display state of the main display unit 3, and the convenience can be further improved.

Although in Embodiment 2 the execution control unit 13A is configured so as to delete, from the candidate list generated by the candidate generation unit 20, both the items related to an items to which an operation is being received by the main operation unit 2, and the items to which the functions needing a change in display performed the main display unit 3 are assigned, and leave the items each satisfying the sub-side priority condition, this configuration is not limiting. Alternatively, the sub display control unit 12 can be configured so as to delete the above-mentioned items from the candidate list generated by the candidate generation unit 20, and leave the items each satisfying the sub-side priority condition.

Finally, an example of the hardware configuration of a display system according to any of the embodiments of the present invention will be explained with reference to FIGS. 12 and 13.

Figure 12:
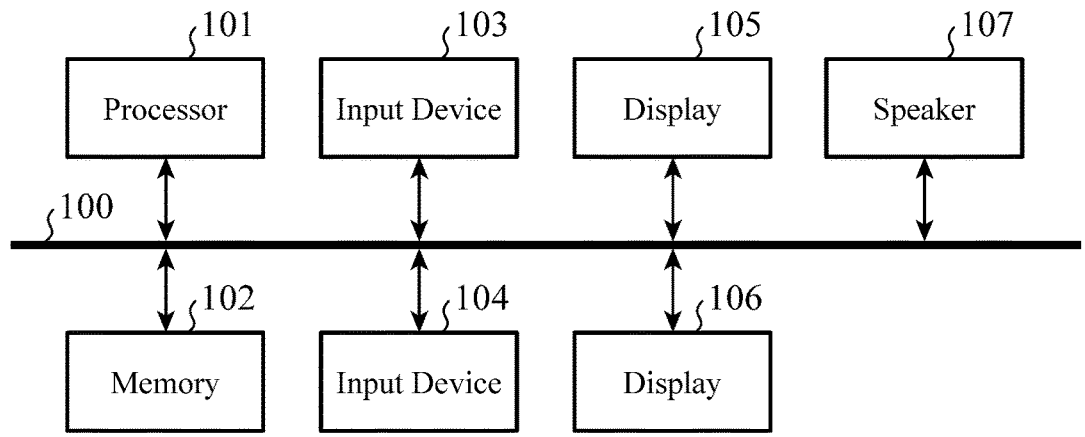
FIG. 12 is a hardware block diagram of the display system according to each Embodiment of the present disclosure.

In the example shown in FIG. 12, a processor 101, a memory 102, input devices 103 and 104, and displays 105 and 106 are connected to a bus 100. Further, a speaker 107 can be connected to the bus 100.

In the display system provided with the vehicle-mounted equipment 1 and the display controller 10 or 10A, the main operation unit 2 is the input device 103, the main display unit 3 is the display 105, the sub operation unit 4 is the input device 104, and the sub display unit 5 is the display 106. The display system can output a voice matching with display performed by the main display unit 3 and display performed by the sub display unit 5 from the speaker 107.

Further, each of the functions of the main display control unit 11, the sub display control unit 12, the execution control unit 13 or 13A, and the execution unit 6 in the display system is implemented by processing circuitry. More specifically, the display system includes processing circuitry for performing display controlling of the main display unit 3 on the basis of the main operation information from the main operation unit 2, performing display controlling of the sub display unit 5 on the basis of the sub operation information from the sub operation unit 4, performing execution controlling of a function assigned to an item for which an operation is received by the main operation unit 2 or a function assigned to an item for which an operation is received by the sub operation unit 4, and executing the functions. The functions of the execution unit 6, the main display control unit 11, the sub display control unit 12, and the execution control unit 13 or 13A can be implemented by plural processing circuits, or can be implemented collectively by a single processing circuit.

The processing circuitry comprises the processor 101 for executing a program stored in the memory 102. The processor 101 can be a central processing unit (CPU), a processing apparatus, an arithmetic apparatus, a microprocessor, a microcomputer, or a digital signal processor (DSP). The memory 102 can be, for example, a non-volatile or volatile semiconductor memory such as a random access memory (RAM), a read only memory (ROM), a flash memory, an erasable programmable ROM (EPROM), or an electrically EPROM (EEPROM), a magnetic disc such as a hard disc or a flexible disc, or an optical disc such as a mini disc, a CD, or a digital versatile disc (DVD).

Each of the functions of the main display control unit 11, the sub display control unit 12, the execution control unit 13 or 13A, and the execution unit 6 in the display system is implemented by software, firmware, or a combination of software and firmware. The software or the firmware is described as a program and the program is stored in the memory 102. The processor 101 implements the function of each of the components by reading and executing the program stored in the memory 102. More specifically, the display system includes the memory 102 for storing the program by which each of the steps shown in FIGS. 4 and 5, or 9 to 11 is performed as a result when the program is executed by the processor 101. Further, it can also be said that this program causes the computer to perform a procedure or a method which each of the components in the display system uses.

Although in the example shown in FIG. 12 the vehicle-mounted equipment 1 and the display controller 10 or 10A are electrically connected via the bus 100, this configuration is not limiting.

Figure 13:
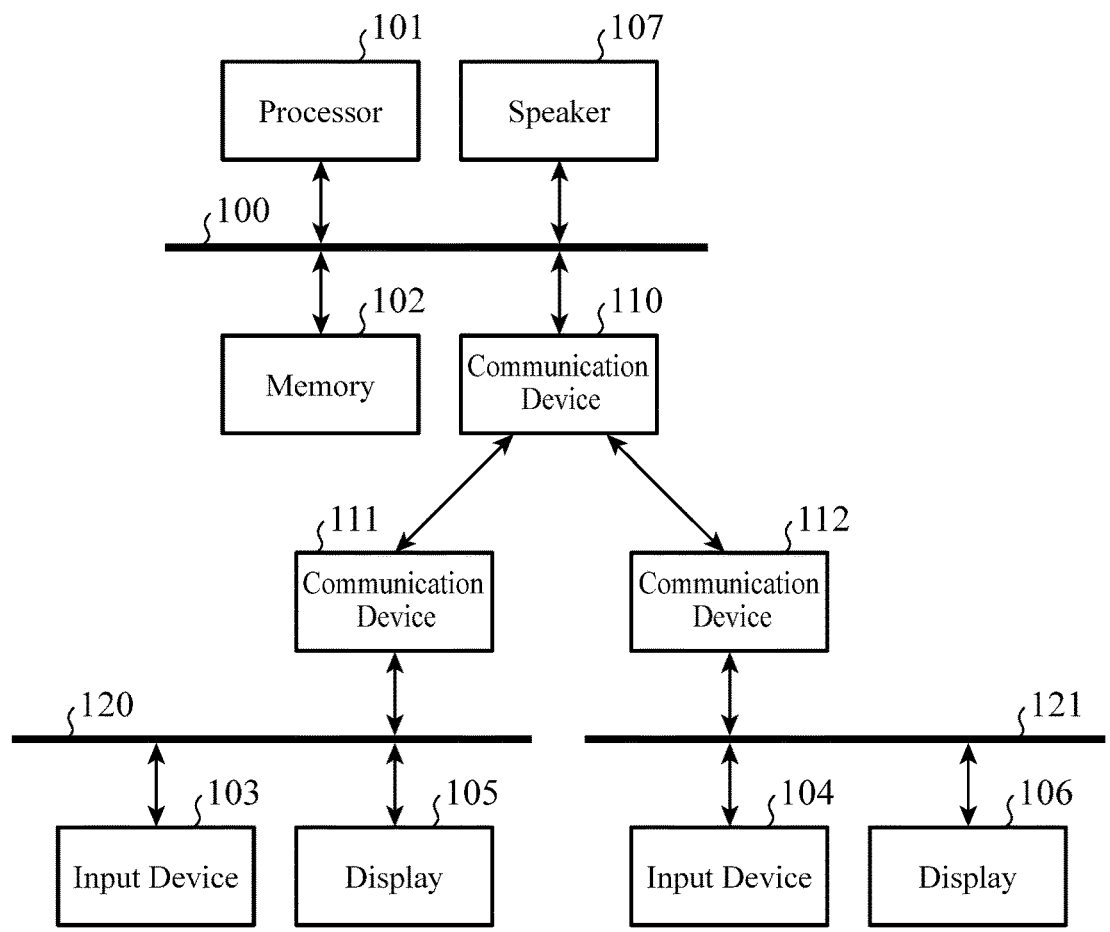
FIG. 13 is a hardware block diagram of the display system according to each Embodiment of the present disclosure.

For example, as shown in FIG. 13, the vehicle-mounted equipment 1 and the display controller 10 or 10A can be configured so as to exchange information, via wireless communications or cable communications, by using communication devices 110, 111, and 112. In the example shown in FIG. 13, the display controller 10 or 10A is comprised of the processor 101, the memory 102, the speaker 107, and the communication device 110 which are connected to the bus 100. The main operation unit 2 and the main display unit 3 of the vehicle-mounted equipment 1 are comprised of the input device 103, the display 105, and the communication device 111 which are connected to a bus 120. The sub operation unit 4 and the sub display unit 5 of the vehicle-mounted equipment 1 are comprised of the input device 104, the display 106, and the communication device 112 which are connected to a bus 121.

Further, although not illustrated, every or some of the following components: the input device 103 which is the main operation unit 2, the display 105 which is the main display unit 3, the input device 104 which is the sub operation unit 4, and the display 106 which is the sub display unit 5 can be configured so as to include respective communication devices, to exchange information with the communication device 110 of the display controller 10 or 10A.

Note that, within the scope of the present invention, any combination of the embodiments can be made, various changes can be made to any component of the embodiments, and any component of the embodiments can be omitted.

INDUSTRIAL APPLICABILITY

Because the display system according to the present disclosure makes it possible to establish cooperation between the two sets of an operation unit and a display unit while preventing interference from occurring between the two sets, the display system is suitable for use as a display system used for a moving object including a vehicle, a railway car, a ship, or an airplane.

REFERENCE SIGNS LIST

1 vehicle-mounted equipment; 2 main operation unit; 3 main display unit; 4 sub operation unit; 5 sub display unit; 6 execution unit; 10, 10A display controller; 11 main display control unit; 12 sub display control unit; 13, 13A execution control unit; 20 candidate generation unit; 100, 120, 121 bus; 101 processor; 102 memory; 103, 104 input device; 105, 106 display; 107 speaker; and 110, 111, 112 communication device.

The invention claimed is:

1. A display controller comprising:
   a main display controller configured to
      receive main operation information from a main operation unit, and
      control information displayed on a main display unit based on the received main operation information, where the main operation unit receives an operation on an item to which a function is assigned and outputs the operation as the main operation information; and
   a sub display controller configured to
      receive the main operation information from the main operation unit and receive sub operation information from a sub operation unit,
      control information displayed on a sub display unit based on the received sub operation information and the received main operation information where the sub operation unit receives an operation on an item to which a function is assigned and outputs the operation as the sub operation information, and
      prohibit the display of both an item related to an item to which an operation is being received by the main operation unit, and an item to which a function needing a change in display performed b the main display unit are assigned so as to display, among items currently displayed on the sub display unit, neither the item related to an item to which an operation is being received by the main operation unit nor the item to which a function needing a change in display performed by the main display unit is assigned.

2. The display controller according to claim 1, further comprising an execution controller to control an execution unit to execute, on a basis of the main operation information and the sub operation information, a function assigned to an item to which an operation is received by the main operation unit and a function assigned to an item to which an operation is received by the sub operation unit, wherein
   the execution controller is configured to control, when the main operation unit is receiving an operation, the execution unit to execute, among functions assigned to items which the sub display controller causes the sub display unit to display, neither a function assigned to an item related to an item to which an operation is being received by the main operation unit nor a function needing a change in display performed by the main display unit.

3. The display controller according to claim 2, wherein if a predetermined sub-side priority condition is satisfied even when the main operation unit is receiving an operation, the execution controller is configured to allow the execution unit to execute both a function assigned to an item related to an item to which an operation is being received by the main operation unit, and a function needing a change in display performed by the main display unit.

4. The display controller according to claim 2, further comprising a candidate generator to generate a candidate list of one or more items to which functions executable by the execution unit are assigned, wherein
   the execution controller is configured to delete, when the main operation unit is receiving an operation, from the candidate list generated by the candidate generator, both an item related to an item to which an operation is being received by the main operation unit, and an item to which a function needing a change in display performed by the main display unit is assigned, to output the candidate list to the sub display control unit, and
   the sub display controller is configured to control items to be displayed on the sub display unit on a basis of the candidate list output by the execution controller.

5. The display controller according to claim 4, wherein if a predetermined sub-side priority condition is satisfied even when the main operation unit is receiving an operation, the execution controller is configured not to delete, from the candidate list generated by the candidate generator, either the item related to an item to which an operation is being received by the main operation unit, or the item to which the function needing a change in display performed by the main display unit is assigned.

6. The display controller according to claim 1, wherein if a predetermined sub-side priority condition is satisfied even when the main operation unit is receiving an operation, the sub display controller is configured to cause, on a basis of the main operation information, the sub display unit to display both an item related to an item to which an operation is being received by the main operation unit, and an item to which a function needing a change in display performed by the main display unit is assigned.

7. The display controller according to claim 6, wherein the display controller is mounted in a vehicle, and a case in which the predetermined sub-side priority condition is satisfied is a case in which either an item being displayed on the sub display unit or an item to which an operation is received by the sub operation unit is an item to which a function of displaying lane guidance, intersection guidance, junction guidance, waypoint arrival guidance, destination arrival guidance, road traffic information guidance, warning guidance, or emergency guidance is assigned.

8. A display system comprising:
   a main operation receiver to receive an operation input on an item to which a function is assigned, and outputting the operation as main operation information;
   a main display;
   a main display controller configured to control information displayed on the main display based on the received main operation information from the main operation receiver;
   a sub operation receiver to receive an operation input on an item to which a function is assigned, and outputting the operation as sub operation information;
   a sub display; and
   a sub display controller configured to
      receive the main operation information from the main operation receiver, and receive sub operation information from the sub operation receiver,
      control information displayed on the sub display based on the received sub operation information and the received main operation information, and
      prohibit the display of both an item related to an item to which an operation is being received by the main operation receiver, and an item to which a function needing a change in display performed by the main display are assigned so as to display, among items currently, displayed on the sub display, neither the item related to an item to which an operation is being received by the main operation receiver nor the item to which a function needing a change in display performed by the main display is assigned.

9. A display control method by a display controller of a main display unit and a sub display unit, comprising:

by a main display control unit, receiving main operation information main operation unit and controlling information displayed on the main display unit based on the received main operation information, where the main operation unit receives an operation input on an item to which a function is assigned and outputs the operation as the main operation information; and by a sub display control unit, receiving the main operation information from the main operation unit and receiving sub operation information from a sub operation unit, and controlling information displayed on the sub display unit based on the received sub operation information and the received main operation information, where the sub operation unit receives an operation on an item to which a function is assigned and outputs the operation as the sub operation information, and by the sub display control unit, prohibiting the display of both an item related to an item to which an operation is being received by the main operation unit, and an item to which a function needing a change in display performed by the main display unit are assigned so as to display, among items currently displayed on the sub display unit, neither the item related to an item to which an operation is being received by the main operation unit nor the item to which a function needing a change in display performed by the main display unit is assigned.

* * * * *